United States Patent

Osterle et al.

[11] Patent Number: 5,823,338
[45] Date of Patent: Oct. 20, 1998

[54] PACKAGING FOR ROD-SHAPED PARTS

[75] Inventors: Helmut Osterle, Feldkrich, Austria; Daniel Gasser, Diepoldsau, Switzerland; Guido Hasler, Marbach, Switzerland; Richard Sahli, Widnau, Switzerland; Walter Seifert, Buchs, Switzerland; Norbert Koppel, Diepoldsau, Switzerland; Markus Steffen, Grabs, Switzerland

[73] Assignee: SFS Industrie Holding AG, Heerbrugg, Switzerland

[21] Appl. No.: 666,450

[22] PCT Filed: Dec. 21, 1994

[86] PCT No.: PCT/EP94/04256

§ 371 Date: Sep. 24, 1996

§ 102(e) Date: Sep. 24, 1996

[87] PCT Pub. No.: WO95/18050

PCT Pub. Date: Jul. 6, 1995

[30] Foreign Application Priority Data

Dec. 27, 1993 [DE] Germany ............ 43 44 679.5
Jul. 13, 1994 [DE] Germany ............ 44 24 750.8

[51] Int. Cl.⁶ ............ B65D 85/24; B65D 73/00
[52] U.S. Cl. .......... 206/338; 206/345; 206/347; 206/485
[58] Field of Search ............ 206/343, 345, 346, 347, 338, 380, 382, 485, 344

[56] References Cited

U.S. PATENT DOCUMENTS

| | | | |
|---|---|---|---|
| 415,175 | 11/1889 | Prouty | 206/344 |
| 1,378,550 | 5/1921 | Miller | 206/344 |
| 1,951,857 | 3/1934 | Boa et al. | 206/380 |
| 3,756,391 | 9/1973 | Keck et al. | 206/343 |
| 3,841,472 | 10/1974 | Fuller et al. | 206/485 |
| 3,967,727 | 7/1976 | Jakesch | 206/344 |
| 3,974,913 | 8/1976 | Hirsch | 206/344 |
| 4,606,455 | 8/1986 | Griskis et al. | |
| 4,804,088 | 2/1989 | Macdonald | 206/346 |

FOREIGN PATENT DOCUMENTS

| | | |
|---|---|---|
| 0320186 | 7/1993 | European Pat. Off. |
| 2216805 | 8/1974 | France . |
| 2682360 | 4/1993 | France . |
| 7205103 | 2/1972 | Germany . |
| 7639013 | 10/1978 | Germany . |
| 2907486 | 8/1980 | Germany . |
| 8010527 | 9/1980 | Germany . |
| 8905973 | 8/1989 | Germany . |
| 1255618 | 12/1971 | United Kingdom ............ 206/343 |

*Primary Examiner*—Paul T. Sewell
*Assistant Examiner*—Anthony Stashick
*Attorney, Agent, or Firm*—Helfgott & Karas, PC.

[57] ABSTRACT

A package for elongated parts (2) has a supporting element (1) made of a supporting strip (4) and of a tear-off covering strip (5). The supporting strip (4) has openings (6) in which the elongated parts (2) are laid, forming a row of parallel elongated parts. The package may be easily removed by tearing the covering strip (5) along perforated lines (13, 14).

19 Claims, 3 Drawing Sheets

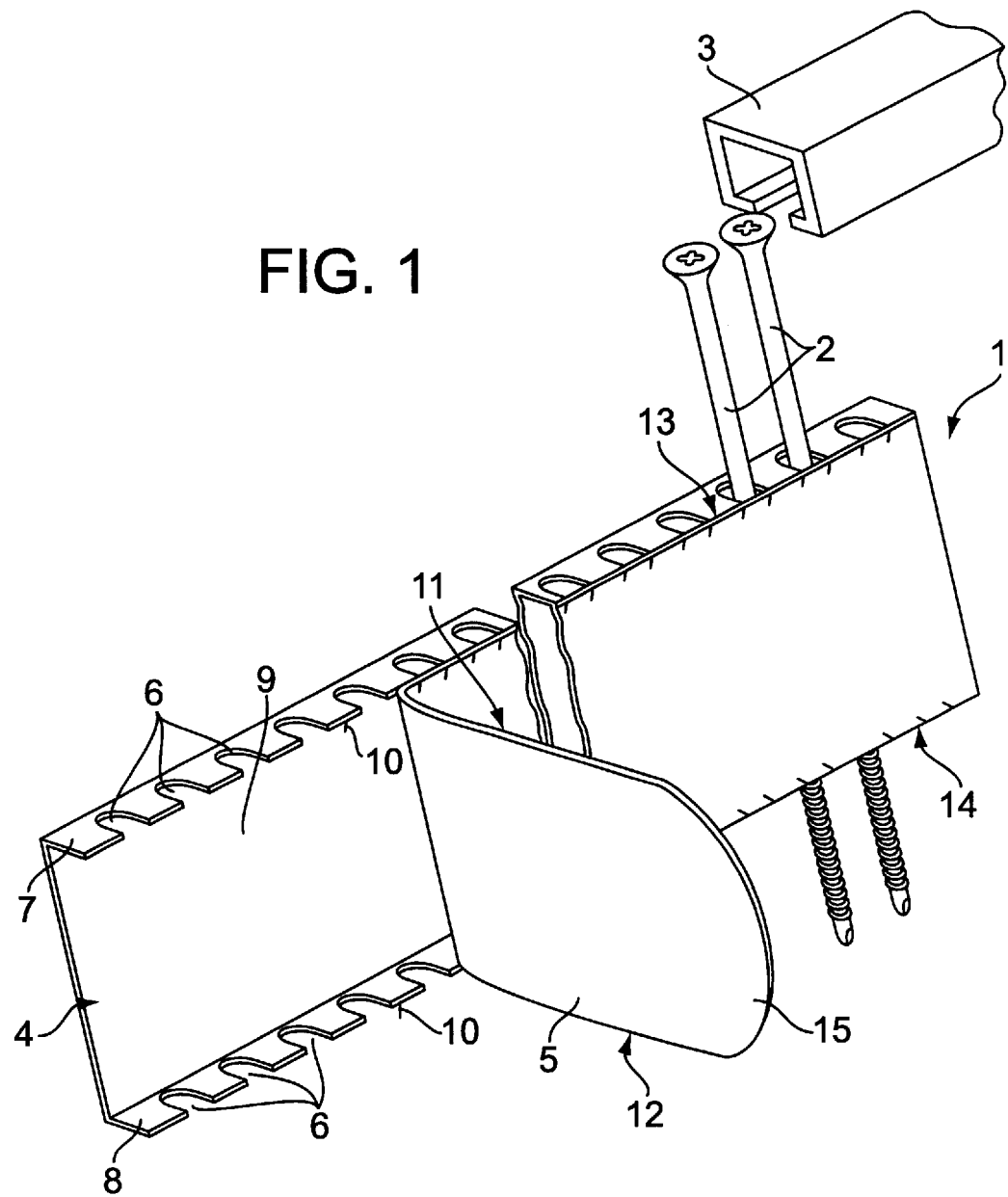

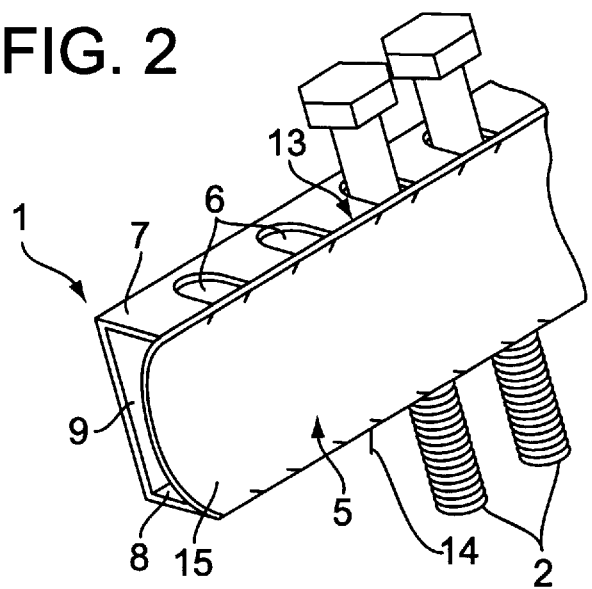
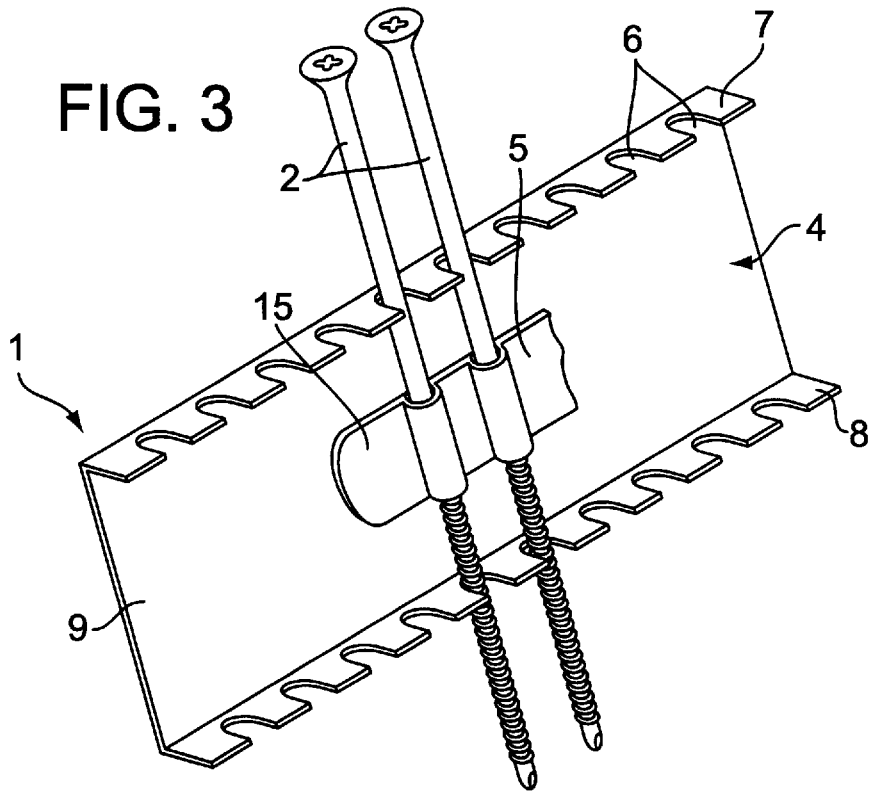

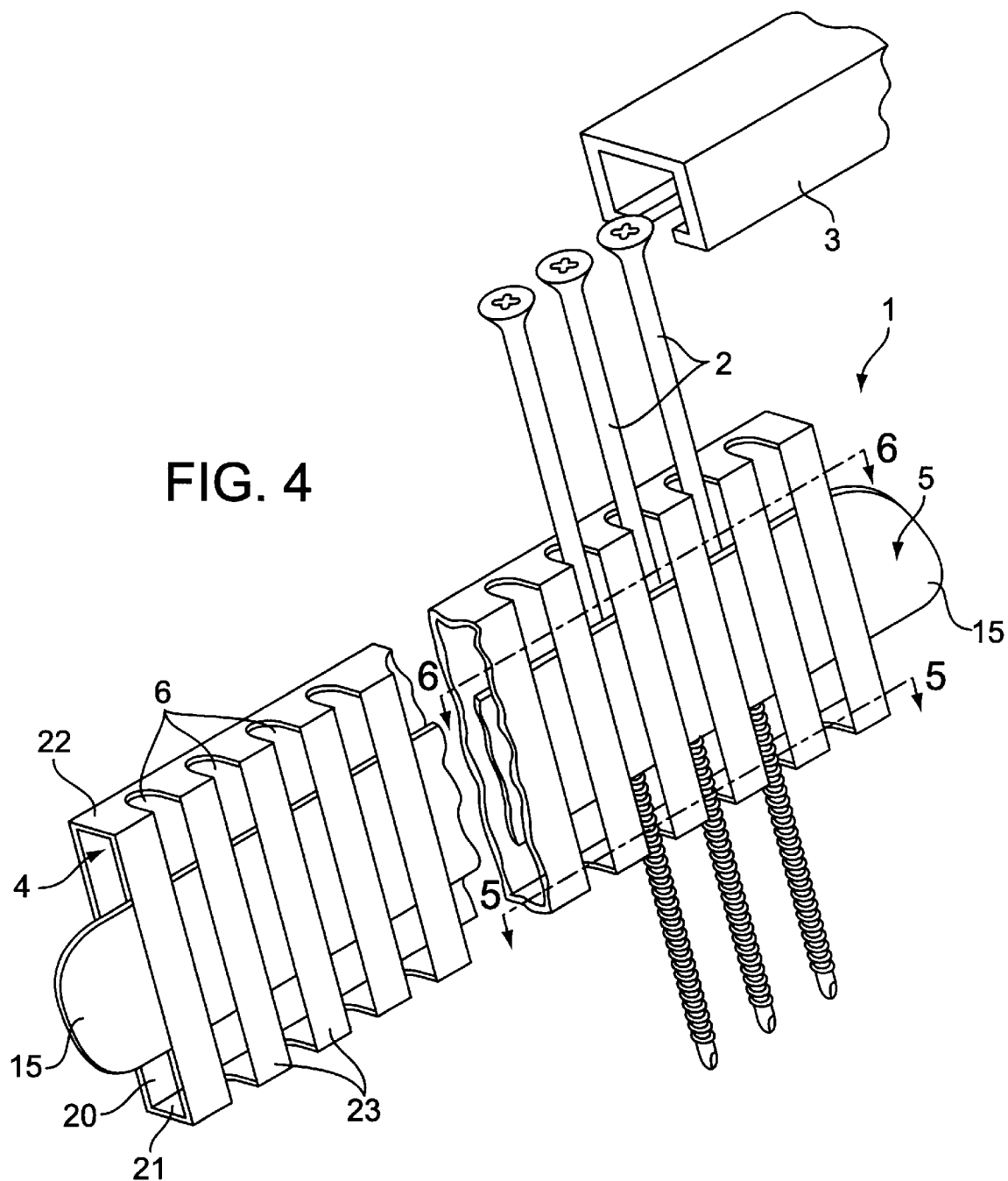
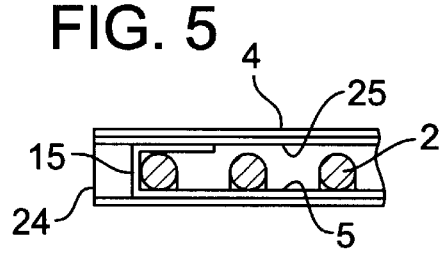
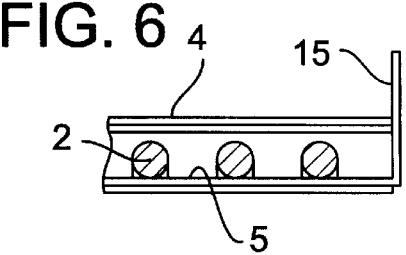

PACKAGING FOR ROD-SHAPED PARTS

This application is a 371 of PCT/EP94/04256 filed Dec. 21, 1994.

BACKGROUND OF THE INVENTION

1. Field of the Invention

The invention relates to packaging for rod-shaped parts, for example screws, bolts, nails, pins or similar articles, in the form of a strip-shaped carrier element, in which the parts can be held parallel to one another and aligned in a row.

2. Description of the Related Art

A number of magazining strips for bolt-shaped attachment elements have already become known (e.g. DE-C-28 07 486, EP-B-320 186, DE-U-76 39 013). In all these magazining or screw strips, the important thing is to hold attachment elements parallel to one another and aligned in a row, and to feed them to a screw-in device in this form. In the screw-in device, the attachment element is then removed from the magazining strip by being turned into the substratum, and by at least partial destruction of the magazining strip. Such magazining strips therefore not only form the packaging elements, but are also needed as a holder for the screws until just before these are processed in a screw-in device. These screws are also held stable in the magazining strip and cannot be easily removed from it, unless sufficient force is exerted.

SUMMARY OF THE INVENTION

The present invention has set itself the task of creating a packaging of the type stated initially, which serves only as a means for orderly transport and for introduction into a corresponding magazine, but which can be easily removed from the held, rod-shaped parts.

According to the invention, this is possible in that the carrier element consists of a holder strip with a plurality of holder openings, indentations, slits, nubs or similar holders to hold the rod-shaped parts aligned parallel to one another, and of a cover strip which covers the region of the rod-shaped parts which lies opposite the holder strip, over part of their length, and which is connected with the holder strip so that it can be torn off, separated, i.e. removed from it.

In this way, a true packaging for rod-shaped parts has been created with a simple design; after the rod-shaped parts have been introduced into a corresponding magazine or a corresponding holder, it can be removed, without the possibility of waste from this packaging falling from this packaging into a processing device or similar equipment.

With such packaging, the rod-shaped parts can be held in orderly manner for the transport segment, in simple manner. Orderly introduction into a corresponding magazine or a processing device is also guaranteed, since the rod-shaped parts can continue to be held aligned. In other words, it is not necessary to individually introduce or individually thread the rod-shaped parts into a processing device, as is the case when they are packaged in conventional boxes. When the rod-shaped parts are in the correct position in a magazine or in a processing device, the cover strip can be torn off, separated, i.e. removed, according to the invention, so that the holder strip on the opposite side can also simply be taken off. As soon as the rod-shaped parts are in their final position in a processing device or a magazine, the packaging is no longer needed and it can be easily removed.

Since such packaging is needed only in the sense of packaging and not as a means of feeding the rod-shaped parts directly into the processing device, it is possible to make the packaging of the most varied materials, with an inherently rigid packaging being advantageous. Therefore it is also possible to use special recyclable material for such packaging, for environmental reasons.

Furthermore, it is proposed that the holder strip be formed essentially in a U shape, with holder openings or indentations being formed in the ridges which run parallel to one another at a distance, separated by a back section. The rod-shaped parts which are inserted are therefore held aligned parallel to one another by two ridges, which are spaced correspondingly apart, where it is very simple to insert the rod-shaped parts into the holder openings, i.e. to push them in in the axial direction. It is particularly advantageous in this connection that the holder openings or indentations are widened towards the free edge region of the ridges, or shaped as U-shaped openings in a top view. As a result, the holder strip can also be simply flipped away or pulled away, without hindrance, from the opposite side of the rod-shaped parts, after the cover strip has been removed, since the inserted rod-shaped parts do not exert any kind of resistance. In other words, the holder openings have no kind of constriction towards the edge of the ridges, so that the holder strip could practically fall away by itself after the cover strip is removed. In an advantageous design development, it is provided that the cover strip touches the free edge region of the ridges with its lengthwise edges, and forms a one-side closure for the holder openings or indentations. This means that with the cover strip, each holder opening becomes an opening with a closed circumference, so that the rod-shaped parts are securely held. However, as soon as the cover strip is torn off or separated, i.e. removed, the rod-shaped parts lie freely in the holder openings of the holder strip, so that the holder strip itself can be easily removed or drops off by itself.

A particularly advantageous development is viewed in that the cover strip is made in one piece with the holder strip, with suitable weakening lines or perforation lines being formed at the ridges and/or at the transition regions between the ridges and the cover strip, so that the cover strip can be torn off. On the one hand, this creates a stable packaging for transport of the rod-shaped parts, on the other hand, a very simple possibility for removal of the cover strip is created. Because of the weakening or perforation line, the cover strip can be torn off over the entire length of the packaging, without exerting any particular force, and then the holder strip which remains on the opposite side of the rod-shaped parts can be easily removed or drops off by itself.

In this connection, it is particularly advantageous if a perforation line is formed directly at the transition between the ridges and the cover strip. This practically removes the one-side closure of the holder opening in the ridges, in that the cover strip is torn off. The openings which are widened towards the free edge region of the ridges, or at least U-shaped in a top view, are then exposed, so that simple removal of the holder strip is possible.

In order to achieve a good hold of the rod-shaped parts, specifically for transport and subsequent feed of the rod-shaped parts to a magazine or to a processing device, it is practical if the holder openings or indentations are slightly smaller in cross-section than the outside diameter or the thread diameter of the rod-shaped parts to be held. In other words, the rod-shaped parts are practically held with a positive and/or non-positive lock, so that they cannot shift in their longitudinal axis.

In another embodiment variation, it is provided that the cover strip overlaps the region of the rod-shaped parts which lies opposite the holder strip, covering them, that it rests against the holder strip in the region between the rod-shaped parts, and is connected to the holder strip so it can be removed or torn off. In other words, the strip-shaped regions of the holder strip and the cover strip lie completely against each other between the rod-shaped parts, and are connected with one another, in this region, so that the cover strip can be removed or torn off. With such a version it is also possible to hold the rod-shaped parts parallel to one another and aligned in a row, where the holder strip nevertheless can be removed in its entirety, or drops off by itself, on the opposite side, by simply removing or tearing off the cover strip.

Furthermore, it is advantageous if the carrier element consists of a holder strip formed as a hollow profile, with a plurality of holder openings, slits or similar holders which are open towards the holding side and run crosswise to the lengthwise expanse of the holder strip, to hold the rod-shaped parts parallel to one another, and of a cover strip which covers the region of the rod-shaped parts which is exposed to the outside in the holder openings.

In this connection, it is practical if the cover strip is inserted between the rod-shaped parts and the inside wall of that segment of the holder strip formed as a hollow profile which is equipped with the holder openings, slits or similar holders, so that it can be moved back and forth and pulled out.

A true packaging for rod-shaped parts has therefore been created, with a simple design, which can be removed after the rod-shaped parts are inserted into a corresponding magazine or a corresponding holder, without waste parts of this packaging being able to fall into a processing device or similar equipment.

The rod-shaped parts can be held in such packaging for the transport segment, in simple and orderly manner. Orderly introduction into a corresponding magazine or into a processing device is also guaranteed, since the rod-shaped parts can continue to be held aligned accordingly. When the rod-shaped parts are in their proper position in a magazine or in a processing device, the cover strip can be pulled out in simple manner, so that the holder strip can then also be taken off the rod-shaped parts in simple manner, by means of the holder openings, slits or similar holders which are then exposed. As soon as the rod-shaped parts are in their final position in a processing device or a magazine, the packaging is no longer needed and it can be very easily removed.

Since such packaging is needed only in the sense of packaging and not as a means of feeding the rod-shaped parts directly into the processing device, it is possible to make the packaging of the most varied materials, with an inherently rigid packaging being advantageous. Therefore it is also possible to use special recyclable material, or in any case biodegradable material, for such packaging, for environmental reasons.

Pursuant to an embodiment variation, it can also be provided that the cover strip can be glued onto the strip-shaped webs of the holder strip shaped as a hollow profile which remain between the holder openings, in removable manner. Therefore all that is necessary is to provide a corresponding hollow profile with the holder openings, where the holder openings are covered with the cover strip, in the form of an adhesive strip, after the rod-shaped parts have been inserted. Quick removal is possible also with such a form.

Furthermore, it is proposed that the holder strip structured as a hollow profile be formed square, rectangular or trapezoid in cross-section, and that the cover strip be made of thin, flat material. Specifically for transport, it is practical for reasons of the space required if the dimensions of the carrier element crosswise to the lengthwise expanse of the element are relatively slight. Only the rod-shaped parts to be inserted and the cover strip which can be inserted and moved, and pulled out, need to have room within the hollow profile of the holder strip.

For special purposes of use, it is also possible, however, that the holder strip structured as a hollow profile has a circular, ellipsoid or polygonal cross-section, and that the cover strip is made of thin, flat material or has a cross-section which approximately fills the residual cross-section between the inserted rod-shaped parts and the inside wall on the side of the holder openings. In other words, even if the cross-section of the holder strip is formed differently, a secure and captive hold of the rod-shaped parts is guaranteed, since they are supported against the inside wall of the holder strip, exactly aligned, in their inserted position within the holder opening.

Within the scope of the invention, it is also possible that the holder strip has holder openings at two opposite regions, with two cover strips or two segments of cover strips, which are connected with each other via a web at their one end, being provided for this holder strip. With a packaging according to the invention, it is therefore also possible to hold two rows of rod-shaped parts aligned parallel to one another, where the rod-shaped parts can then be inserted or taken out on two different sides of the holder strip. With such a structure, practically twice the number of rod-shaped parts can be held in a single package, using an amount of material which is not much greater than for the single-row arrangement.

For various designs, it is practical if the cover strip and the holder strip are connected with one another, in removable manner, by gluing or embossing. In other words there is a plurality of possibilities as to how the cover strip and the holder strip are connected with one another, all that has to be assured is very simple removal. This means that a correspondingly stable packaging is always created for transport, and when it is no longer needed, it can be removed in its entirety with a very simple action, for example tearing off or removing a cover strip.

In order to facilitate handling or operation of this packaging specifically when it is to be removed, it is proposed that the cover strip have a handle tab at least on one of its ends. With such a projecting region, it is easier to take hold of the cover strip and to pull it out, tear it off or remove it in the region of the connecting points to the holder strip.

With such a projecting region, it is also easier to take hold of the cover strip and pull it out of the holder strip structured as a hollow profile. In this connection, it is particularly advantageous if the handle tab is bent down into the holder strip structured as a hollow profile, at least at one end, and engages between the inserted rod-shaped parts and the inside wall of the holder strip opposite the holder openings. At the same time, this ensures additional transport security of the cover strip, so that it cannot be unintentionally pulled out.

There is the possibility of making the holder strip and the cover strip of the same material, or of different materials. Depending on the transport method, depending on the type of shipment in multiple packages, and depending on the area of use, different material combinations can therefore be used. Specifically depending on the area of use, it is also practical if the holder strip and/or the cover strip are made from a metal foil, from plastic or from cardboard.

BRIEF DESCRIPTION OF THE DRAWINGS

Further characteristics of the invention and specific advantages will be explained in greater detail in the following description, which is based on the drawings. These show:

FIG. 1 a slanted view of a packaging according to the invention, with the rod-shaped parts which are held in this packaging being introduced into a magazining channel;

FIG. 2 and 3 further embodiment variations of the invention;

FIG. 4 a slanted view of another embodiment of a packaging according to the invention, with the rod-shaped parts which are held in this packaging being introduced into a magazining channel;

FIG. 5 and FIG. 6 horizontal cross-sections through the end regions of this packaging.

DETAILED DESCRIPTION

Using a packaging according to FIG. 1, rod-shaped parts 2, such as long screws here, for example, are to be held parallel to one another and aligned in a row, for transport, and can be introduced into the rail 3 of a magazine, for example, in this alignment. The packaging is structured as a carrier element 1, which consists of a holder strip 4 and a cover strip 5. The holder strip 4 has a plurality of holder openings 6, in order to hold the rod-shaped parts 2 at a uniform distance from one another and parallel to one another.

The holder strip 4 is formed essentially in a U shape, with holder openings 6 being formed in the ridges 7, 8 which run parallel to one another at a distance, projecting from the back section 9. As can be very clearly seen in the drawing, the holder openings 6 are widened towards the free edge region 10 of the ridges 7, 8, or at least shaped as U-shaped openings in a top view, so that if no cover strip 5 is making contact in front of these openings 6, the rod-shaped parts 2 inserted here can be simply taken out, or, vice versa, the holder strip 4 can be simply pulled away from the back of the rod-shaped parts 2. The cover strip 5 touches the edge regions 10 of the ridges 7, 8 with its lengthwise edges 11 and 12, and thereby forms a one-side closure for the holder openings 6. In the embodiment variation shown in FIG. 1, the cover strip 5 is made in one piece with the holder strip 5 [sic], with perforation lines 13, 14 formed directly in the edge region, in other words at the transition between the ridges 7, 8 and the cover strip. Therefore the cover strip 5 can be very easily removed or torn off the holder strip 4. All that needs to be done is for the cover strip 5 to be grasped at one end, so that it can be removed in one move, over the entire length of the carrier element 1. It is then easily possible to remove the holder strip 4 from the back, or it is even possible, because of the special shape of the holder openings 6, that the holder strip 4 practically drops off by itself.

Within the scope of the invention, it is certainly possible that instead of perforation lines, other weakening lines are present, since all that is necessary is to create the possibility of tearing off or removing the cover strip accordingly, without any special tool being required. Therefore it would also be possible to form these weakening lines or perforation lines 13, 14 not directly in the edge region, but on the ridges 7 and 8 and/or at corresponding transition regions between the ridges 7, 8 and the cover strip 5. If the perforation lines 13, 14 are arranged in the region of the ridges 7, 8, it would also be possible to provide circular holder openings 6, where the perforation lines 13, 14 would then practically pass through the center axes of these openings. Even in such a case, the holder strip 4 which remains after the cover strip 5 is torn off could be removed immediately, without exerting any force.

It is advantageous if the holder openings 6 are structured in such a way that they are slightly smaller in cross-section, or at least in their dimension in one direction, than the outside diameter or the thread diameter of the rod-shaped parts 2 to be held. This guarantees that the rod-shaped parts 2 cannot shift unnecessarily in their axial direction in the package.

In the drawing, the carrier element is shown as a one-piece part, which forms a closed circumference. For simple production, such a packaging is made from a flat material, with two overlapping edge strips being glued together after the holder openings and the perforation lines have been made, and after the bent ridges have been pre-finished, in order to produce this carrier element, which is rectangular when viewed in cross-section.

Within the scope of the invention, it is also possible to make the back part 9 with interruptions or to leave it out entirely, in parts, over the entire lengthwise direction, so that only the ridges 7, 8 and small angled segments connected with them remain. In this case, the holder strip would practically be formed of two parts, arranged at a distance from one another. If the cover strip 5 is then pulled off, the two back parts, namely the two segments of the holder strip, formed only of the ridges 7 and 8, in such a case, would fall down. A similar solution would also be possible if the holder strip 4 were to be formed as shown in FIG. 1, but with narrow cover strips being connected with each edge 10 of the ridges 7 and 8, which would then have to be torn off. It would also be possible, however, to connect these two narrow cover strips 5 via a corresponding stirrup at one end, or to provide a handle tab 15 at each of these segments of cover strips 5, just as for the cover strip 5 according to FIG. 1.

In the embodiment according to FIG. 2, the same design measures and embodiments are provided as in FIG. 1, but the cross-sectional shape of the carrier element 1 is made to be almost square, so that the two ridges 7 and 8 are significantly longer and the back part 9 is correspondingly smaller. Such a design would be particularly practical if relatively heavy rod-shaped parts or rod-shaped parts which are only part of a larger design unit are to be packaged. After all, the measures according to the invention make it possible to create packaging variants for different design units which have screws, bolts, nails, pins or similar articles in some way, which can then be held in the packaging according to the invention. It is by no means the case that these bolts or pins always have to be cylindrical. It is certainly possible to hold such bolts in such packaging as rod-shaped parts with different cross-sectional shapes.

In the embodiment according to FIG. 3, the holder strip 4 again has practically the same structure as in the embodiment according to FIG. 1, but a different structure and arrangement of the cover strip 5 is provided. Here, the cover strip 5 is arranged on the region of the rod-shaped parts 2 which lies opposite the holder strip 4, covering them, with the cover strip 5 resting against the back part 9 of the holder strip 4 in the region between the rod-shaped parts 2, and being connected with it so as to be removed or torn off. With such an embodiment, the same effect can be achieved as with the variants according to FIG. 1 and 2, because here again, the cover strip 5 can be torn off or removed by grasping the handle tab 15, so that the rod-shaped parts 2 again lie freely in the holder strip 4, which can then be pulled off to the back or drops off by itself. The connection between the holder strip 4 and the cover strip 5 can be produced, for example, by gluing or by an embossing process, so that very simple tearing or removal is always possible.

A packaging according to FIG. 4 is used to hold rod-shaped parts 2, such as here, for example, long screws, also parallel to one another and aligned in a row, for transport, and they can be introduced into a rail 3 of a magazine, for example, in such an alignment. The packaging, in this case, is formed as a carrier element 1 which consists of a holder strip 4 and a cover strip 5. The holder strip 4 has a plurality of holder openings 6, in order to hold the rod-shaped parts 2 at a uniform distance from one another and aligned parallel to one another.

Here, the holder strip 4 is structured as a hollow profile and consists, in the example shown, of a closed back part 20, the top and bottom ridges 21 and 22, and strip-shaped segments 23 which remain between the holder openings 6. If the holder strip is produced from a flat material, the two edge regions of this strip-shaped material can be overlapped and connected with one another, for example glued together, as this is evident from the cross-sectional region in FIG. 4 and also in FIG. 5 and 6. Specifically when making the holder strip from a flat material, it is, of course, very simple to form the region of the holder openings 6 by means of a punching process.

To close off the holder openings 6 after the rod-shaped parts 2 have been inserted, the cover strip 5 is pushed into the holder strip 4 structured as a hollow profile, namely into the region between the rod-shaped parts 2 and the inside wall 24 of the holder strip 4. This closes off the holder openings 6 towards the outside, in simple manner, and the rod-shaped parts 2 are securely held.

In the example shown, a bent packaging made from flat material is involved. It would also be possible to produce a drawn hollow profile, with corresponding slits being produced in an outside wall of the holder strip 4. The cross-sectional shape of the packaging shown in the drawing is practical, i.e. if the holder strip 4 is made to be rectangular in cross-section. For very special rod-shaped parts, for example for parts 2 which are relatively thick in diameter, a square cross-sectional shape is also possible. Of course, other cross-sectional shapes, such as a trapezoid structure of the holder strip, are also possible. Within the scope of the invention, it is also possible, however, to give the holder strip a circular, ellipsoid or polygonal structure, where the cover strip 5 is then made of thin, flat material, in the same manner as the version according to FIG. 4. With such a cross-sectional structure of the holder strip 4, however, it would also be possible to use a cover strip which has a cross-section which approximately fills the residual cross-section between the rod-shaped parts 2 to be inserted and the inside wall on the side of the holder openings. Again, proper support of the inserted rod-shaped parts 2 against the inside wall of the holder strip 4 is guaranteed.

As is evident from FIG. 4, it is practical if the cover strip 5 has a lesser width than the length of the holder openings 6, measured in the longitudinal expanse of the rod-shaped parts 2 to be inserted. This not only makes it easy to introduce the cover strip 5, but also makes it easier to pull it out.

The drawing figures show that the holder openings 6 are widened towards the free edge region, or shaped as U-shaped openings in a top view. Specifically if a certain widening towards the edge is provided, it is significantly easier to tilt or pivot the packaging away after the cover strip 5 has been pulled out. The holder openings 6 are also slightly smaller in cross-section than the outside diameter or the thread diameter of the rod-shaped parts 2 to be held, in order to guarantee that the rod-shaped parts 2 cannot shift unnecessarily in their axial direction in the packaging.

Also in this embodiment, the cover strip 5 has a handle tab 15 on at least one of its ends. In the embodiment shown, a handle tab 15 is provided on each of the two ends of the cover strip. In one variant, i.e. as the formation at one end of the packaging, it can be provided that the handle tab 15 is bent down into the holder strip 4 structured as a hollow profile, and engages between the inserted rod-shaped parts 2 and the inside wall 25 of the holder strip 4 opposite the holder openings 6. In this way, as is clearly evident from FIG. 5, transport security is provided. On the other side, in other words on the other end of the holder strip 4, the handle tab 15 can be simply bent around, so that it is not in the way in the larger packaging box of which this packaging is a part. Specifically because of the bent arrangement, the handle tab 15 projects relatively far out and can therefore be grasped easily, to pull the cover strip 5 out when needed.

In a particular embodiment, which is not shown in the drawings, holder openings 6 could be provided at two opposite regions of the holder strip 4, where the holder strip would, of course, have to be correspondingly wider in the direction crosswise to its lengthwise expanse. It would then be possible to fill the holder strip 4 from opposite sides. Such a formation could also be achieved if two holder strips 4 were connected with each other back to back. However, this would mean that the same amount of material would be needed, whether or not the capacity is doubled. Such a version would be practical if no corresponding partition between the rod-shaped parts to be inserted from opposite sides would have to be formed. However, with such a version it would be necessary, in any case, to provide two cover strips, in other words between the inserted rod-shaped parts 2 and the related inside wall of the holder strip 4. In this connection, two individual cover strips 5 could be provided, or two segments of cover strips which are connected with each other via a web at one end. Again, such a structure would only be practical if two magazine channels which are parallel to one another are to be simultaneously filled with these two rows of rod-shaped parts held by a single holder strip. Otherwise, it would always be necessary to turn the packaging by 180° for consecutive filling, and then the next cover strip 5 can be pulled out.

Instead of a cover strip 5 which can be pushed in, for a design of the holder strip 4 according to FIG. 4, an adhesive strip can also be provided, which is glued onto the strip-shaped webs 23 which remain between the holder openings 6, in removable manner. In this way, it is possible to provide a captive hold of the rod-shaped parts, particularly of screws, in a corresponding carrier element. Also with such a structure, the carrier element can be rapidly removed, in that the adhesive strip is simply pulled off, whereupon the holder strip can be pulled away to the opposite side of the rod-shaped parts.

The shape of the holder strips 4 and the cover strips 5 or multiple parts of such holder strips or cover strips can be structured in the most varied manner. All that is necessary, in every case, is that the rod-shaped parts can be held parallel to one another and aligned in a row, and that the cover strip can be removed by tearing it off, pulling it off or releasing it from the holder strip. Depending on the area of use, the holder strip and the cover strip can be made from the same material or different materials. Practical materials in this connection are metal films, plastic or cardboard. Specifically in the construction sector, the use of cardboard, metal foils, but also plastic is practical, since these can be recycled together with similar materials which occur in the construction site.

What is claimed is:

1. Packaging for rod-shaped parts, such as screws, bolts, nails or pins, in the form of a strip-shaped carrier element, in which the parts, such as screws, bolts, nails or pins, can be held parallel to one another and aligned in a row, where the carrier element (1) consists of a holder strip (4) with a plurality of holder openings (6), indentations, slits, nubs or similar holders, to hold the rod-shaped parts (2) aligned parallel to one another, and of a cover strip (5) which covers the region of the rod-shaped parts (2) which lies opposite the holder strip (4), over part of the length, characterized in that the holder strip (4) is structured to be essentially U-shaped, where the holder openings (6) or indentations are formed in ridges (7,8) which run parallel to and at a distance from one another, projecting from a back part (9) and that the cover strip (5) is connected with the holder strip (4) in such a way that it is possible to tear, separate or remove the cover strip (5) from the holder strip in one piece, the cover strip (5) being made in one piece with the holder strip (4), with suitable weakening lines or perforation lines (13, 14) being formed at the ridges (7, 8) and/or at the transition regions between the ridges (7, 8) and the cover strip (5), so that the cover strip (5) can be torn off.

2. Packaging according to claim 1, characterized in that the holder openings (6) or indentations are widened towards the free edge region (10) of the ridges (7,8).

3. Packaging according to claim 1, characterized in that the cover strip (5) touches the free edge region (10) of the ridges (7, 8) with its lengthwise edges (11, 12), and forms a one-side closure for the holder openings (6) or indentations.

4. Packaging according to claim 1, characterized in that a perforation line (13, 14) is formed directly in the edge region, in other words at the transition between the ridges (7, 8) and the cover strip (5).

5. Packaging according to claim 1, characterized in that the holder openings (6) or indentations are slightly smaller in cross-section than the outside diameter or the thread diameter of the rod-shaped parts (2) to be held.

6. Packaging according to claim 1, characterized in that the cover strip (5) overlaps the region of the rod-shaped parts (2) which lies opposite the holder strip (4), covering them, that it rests against the holder strip (4) in the region between the rod-shaped parts (2), and is connected to the holder strip (4) so it can be removed or torn off.

7. Packaging according to claim 1, characterized in that the carrier element (1) consists of a holder strip (4) formed as a hollow profile, with a plurality of holder openings (6), slits or similar holders which are open towards the holding side and run crosswise to the lengthwise expanse of the holder strip (4), to hold the rod-shaped parts (2) parallel to one another, and of a cover strip (5) which covers the region of the rod-shaped parts (2) which is exposed to the outside in the holder openings (6).

8. Packaging for rod-shaped parts, in the form of a strip-shaped carrier element, in which the parts can be held parallel to one another and aligned in a row, where the carrier element (1) consists of a holder strip (4) with a plurality of holder openings (6), indentations, slits, nubs or similar holders, to hold the rod-shaped parts (2) aligned parallel to one another, and of a cover strip (5) which covers the region of the rod-shaped parts (2) which lies opposite the holder strip (4), over part of the length, characterized in that the holder strip (4) is structured to be essentially U-shaped, where the holder openings (6) or indentations are formed in ridges (7,8) which run parallel to and at a distance from one another, projecting from a back part (9) and that the cover strip (5) is connected with the holder strip (4) in such a way that it is possible to tear, separate or remove the cover strip (5) from the holder strip in one piece, the carrier element (1) consisting of a holder strip (4) formed as a hollow profile, with a plurality of holder openings (6), slits or similar holders which are open towards the holding side and run crosswise to the lengthwise expanse of the holder strip (4), to hold the rod-shaped parts (2) parallel to one another, and of a cover strip (5) which covers the region of the rod-shaped parts (2) which is exposed to the outside in the holder openings (6), the cover strip (5) being inserted between the rod-shaped parts (2) and the inside wall (24) of that segment of the holder strip (4) formed as a hollow profile which is equipped with the holder openings (6), slits or similar holders, so that the holder strip (4) can be moved back and forth and pulled out.

9. Packaging according to claim 7, characterized in that the cover strip (5) is glued onto strip-shaped webs (23) of the holder strip (4) shaped as a hollow profile which remain between the holder openings (6), in removable manner.

10. Packaging according to claim 7, characterized in that the holder strip (4) structured as a hollow profile is formed square, rectangular or trapezoid in cross-section, and that the cover strip (5) is made of thin, flat material.

11. Packaging according to claim 7, characterized in that the holder strip (4) structured as a hollow profile has a circular, ellipsoid or polygonal cross-section, and that the cover strip (5) is made of thin, flat material or has a cross-section which approximately fills the residual cross-section between the inserted rod-shaped parts (2) and an inside wall (24) on the side of the holder openings (6).

12. Packaging according to claim 7, characterized in that width of the cover strip (5) is less than the length of the holder openings (6), measured in the longitudinal expanse of the rod-shaped parts (2) to be inserted.

13. Packaging according to claim 7, characterized in that the holder strip (4) has holder openings (6) at two opposite regions, with two cover strips (5) or two segments of cover strips (5), which can be connected with each other via a web at their one end, being provided for this holder strip.

14. Packaging according to claim 1, characterized in that the cover strip (5) and the holder strip (4) are connected with one another, in removable manner, by gluing or embossing.

15. Packaging according to claim 1, characterized in that the cover strip (5) has a handle tab (15) at least on one of its ends.

16. Packaging according to claim 7, characterized in that a handle tab (15) is bent down into the holder strip (4) structured as a hollow profile, at least at one end, and engages between the inserted rod-shaped parts (2) and an inside wall (25) of the holder strip (4) opposite the holder openings (6).

17. Packaging according to claim 1, characterized in that the holder strip (4) and the cover strip (5) are made of the same material, or of different materials.

18. Packaging according to claim 17, characterized in that the holder strip (4) and/or the cover strip (5) are made from a metal foil, from plastic or from cardboard.

19. Packaging according to claim 2, characterized in that the holder openings (6) or indentations are structured as U-shaped openings.

* * * * *